(12) United States Patent
Yao et al.

(10) Patent No.: US 10,181,801 B2
(45) Date of Patent: Jan. 15, 2019

(54) POWER CONVERTERS WITH ADAPTIVE OUTPUT VOLTAGES

(71) Applicants: DIALOG SEMICONDUCTOR INC., Campbell, CA (US); DIALOG SEMICONDUCTOR (UK) LIMITED, London (GB)

(72) Inventors: Jianming Yao, Campbell, CA (US); Weihai Huang, Tianjin (CN); Honglai Wang, Tianjin (CN)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days.

(21) Appl. No.: 15/826,573

(22) Filed: Nov. 29, 2017

(65) Prior Publication Data

US 2018/0083549 A1    Mar. 22, 2018

Related U.S. Application Data

(63) Continuation of application No. PCT/CN2015/084152, filed on Jul. 15, 2015.

(51) Int. Cl.
| | |
|---|---|
| *H02M 3/156* | (2006.01) |
| *H02M 7/12* | (2006.01) |
| *H02J 7/00* | (2006.01) |
| *H02M 1/08* | (2006.01) |
| *H02M 7/217* | (2006.01) |
| *H02M 1/00* | (2006.01) |
| *H02J 7/34* | (2006.01) |

(52) U.S. Cl.
CPC ........... *H02M 7/125* (2013.01); *H02J 7/0004* (2013.01); *H02J 7/0052* (2013.01); *H02J 7/0072* (2013.01); *H02M 1/08* (2013.01); *H02M 3/156* (2013.01); *H02M 7/12* (2013.01); *H02M 7/217* (2013.01); *H02J 7/345* (2013.01); *H02J 2007/0062* (2013.01); *H02M 2001/0025* (2013.01); *H02M 2001/0029* (2013.01)

(58) Field of Classification Search
None
See application file for complete search history.

(56) References Cited

U.S. PATENT DOCUMENTS

| | | | |
|---|---|---|---|
| 6,424,121 B1 * | 7/2002 | Khouri | G11C 11/56 320/128 |
| 7,701,690 B1 | 4/2010 | Li et al. | |
| 9,583,952 B2 * | 2/2017 | Miyanaga | H02J 7/0016 |
| 2003/0048003 A1 * | 3/2003 | Daniels | H02J 1/00 307/42 |

(Continued)

FOREIGN PATENT DOCUMENTS

| | | |
|---|---|---|
| CN | 101540542 A | 9/2009 |
| CN | 201303292 Y | 9/2009 |

(Continued)

OTHER PUBLICATIONS

PCT Search Report and Written Opinion dated Sep. 28, 2015 from corresponding International Application No. PCT/CN2015/084152 filed Jul. 15, 2015.

*Primary Examiner* — Jeffrey A Gblende
(74) *Attorney, Agent, or Firm* — Haynes and Boone, LLP

(57) ABSTRACT

A switching power converter is provided that transitions between output voltage modes over a delay period using at least one of an adaptive resistor and an adaptive reference voltage circuit.

16 Claims, 8 Drawing Sheets

(56) References Cited

U.S. PATENT DOCUMENTS

| | | | | |
|---|---|---|---|---|
| 2005/0219882 A1* | 10/2005 | Wu | ............... | H02M 7/003 363/146 |
| 2008/0231294 A1* | 9/2008 | You | ............... | G01N 27/02 324/725 |
| 2009/0079501 A1* | 3/2009 | Watai | ............... | G01D 3/02 330/254 |
| 2014/0167719 A1* | 6/2014 | Chu | ............... | H02M 3/07 323/282 |

FOREIGN PATENT DOCUMENTS

| | | |
|---|---|---|
| CN | 201435679 Y | 3/2010 |
| CN | 102332827 A | 1/2012 |
| JP | 2986975 B2 | 12/1999 |

\* cited by examiner

POWER CONVERTERS WITH ADAPTIVE OUTPUT VOLTAGES

CROSS-REFERENCE TO RELATED APPLICATIONS

This application is a continuation of International Application No. PCT/CN2015/084152 filed Jul. 15, 2015, which is hereby incorporated by reference in its entirety.

TECHNICAL FIELD

This application relates to switching power converters, and more particularly to a switching power converter with adaptive output voltages.

BACKGROUND

Switching power converters typically have a fixed output voltage. For example, a fixed-output-voltage AC-DC switching power converter converts the AC line voltage into a DC output voltage that is regulated to be substantially constant. An example fixed-output voltage switching power converter 100 is shown in FIG. 1 regulates an output voltage (V_OUT) across an output capacitor C1. To keep this output voltage in regulation, switching power converter 100 samples the output voltage through a voltage divider such as formed by a pair of resistors R1 and R2 to produce a feedback voltage (V_FB). An error amplifier U1 compares the feedback voltage to a reference voltage produced by a reference voltage source (V_REF). A modulator U2 controls the switching of a power switch S1 responsive to the error signal to regulate the output voltage.

The resulting fixed output voltage such as 5.0 V is problematic for fast charging of modern devices. In particular, it is conventional for a switching power converter to couple to the device being charged through a standard interface such as a Universal Serial Bus (USB) interface. The USB interface includes a differential pair of signals (D+ and D−) for signaling and also provides power and ground. With regard to the delivery of power, a USB cable can only support a certain amount of current. For example, the USB 2.0 standard allows for a maximum output current of 500 mA whereas the USB 3.0 standard can support a maximum output current of 900 mA. Traditionally, the delivery of power through a USB cable used a voltage of 5.0 V. But modern mobile device batteries have relatively large storage capacities such as several thousand milliamps. The charging of such batteries, even at the increased output currents allowed in the USB 3.0 standard, will thus be delayed if the power is delivered using a 5 volt power supply voltage. This is particularly true in that the switching power supply, the cable, and the receiving device all present a resistance to the output current.

To enable a rapid charge mode in light of the output current limitations and associated losses from device resistances, it is now becoming conventional to use markedly higher output voltages over the USB cable. For example, rather than use the conventional USB output voltage of 5 V, power switching converters have been developed that support rapid charging modes using output voltages of 9V, 12V, or even 19V. The increased output voltages allow the switching power supply to deliver more power over the USB cable without exceeding the maximum output current limitations. However, many legacy devices can only except the standard 5V from a USB cable. A rapid-charge switching power supply will thus engage in an enumeration process with the device being charged to determine if the higher output voltages are supported. This enumeration may occur over the differential D+ and D− pins. Through the enumeration, the switching power converter and the enumerated device may change the USB output voltage to an increased level that is supported by the enumerated device. The result is considerably reduced charging time, which leads to greater user satisfaction.

An example fast-charge power converter 200 is shown in FIG. 2. Error amplifier U1, modulator U2, power switch S1, output capacitor C1, and the feedback voltage divider formed by resistors R1 and R2 operate as discussed with regard to fixed-output power converter 100. However, fast-charge power converter 200 includes a resistor R3 and a fast-mode switch S1 coupled between the feedback voltage input to error amplifier U1 and ground. If fast-mode switch S1 is switched on, resistors R3 and R2 are coupled in parallel such that the resistance between the feedback voltage input and ground drops. The feedback voltage will thus drop when switch S1 is switched on, which causes the error signal to increase. The modulator U2 will thus increase its modulation of the cycling of switch S1 to increase the output voltage. For example, if modulator U2 is a pulse-width modulator, it would then increase the pulse width for the cycling of power switch S1. Conversely, if the fast-mode switch S2 is switched off, the output voltage will drop in response to the sudden increase in the feedback voltage amplitude. A mode control circuit 205 controls the fast-mode switch S2 to select between the output voltage levels.

FIG. 3A illustrates a resulting on and off waveform for fast-mode switch S2 to select between the high output voltage and low output voltage modes. When the gate voltage for the fast-mode switch transistor S2 is high, the transistor turns on to select for the high output voltage mode. When the gate voltage is 0 V, the fast-mode switch transistor S2 turns off to select for the low output voltage mode. The sudden switching on of the fast-mode switch transistor S2 at a time t0 causes an abrupt drop in the feedback voltage at the input node to the error amplifier as shown in FIG. 3B. Similarly, the switching off of the fast-mode switch transistor S2 at a time t1 causes a sharp increase in the feedback voltage. These abrupt swings in the feedback voltage are undesirable. For example, the sudden drop in the feedback voltage at time t0 can trigger an under-voltage condition whereas the sudden increase in the feedback voltage at time t1 can trigger an over-voltage condition. The corresponding switching power converter would then react to false alarm conditions that are artifacts of the abrupt changes in resistance for sensing the feedback voltage during output voltage mode transitions. A waveform for the output voltages produced by the cycling of the fast-mode switch S2 of FIG. 3A is shown in FIG. 3C. The resulting sudden changes in the error signal from the switching on of the fast-mode switch S2 at time t0 produces an undesirable over-shoot and ringing of the output voltage during the transition to the high output voltage mode. This over-shoot of the output voltage may stress or harm the device being charged.

Accordingly, there is a need in the art for improved regulation of the output voltage during output voltage shifts for a power converter having multiple output voltage modes.

SUMMARY

A switching power converter is provided with at least one of an adaptive resistor and an adaptive reference voltage circuit to reduce or eliminate undervoltage and overvoltage alarm conditions from occurring during a transition from one output voltage mode to another. The adaptive resistor is configured to provide an adaptive resistance that has a first value for a first output voltage mode and a second value for a second output voltage mode. The adaptive resistor is further configured to gradually change between the first and second values over a delay period during a transition between the first and second output voltage modes.

Similarly, the adaptive reference voltage circuit is configured to provide an adaptive reference voltage that has a first value for the first output voltage mode and a second value for the second output voltage mode. The adaptive reference circuit is further configured to gradually change between the first and second values over a delay period during a transition between the first and second output voltage modes.

These advantageous features may be better appreciated through a consideration of the detailed description below.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
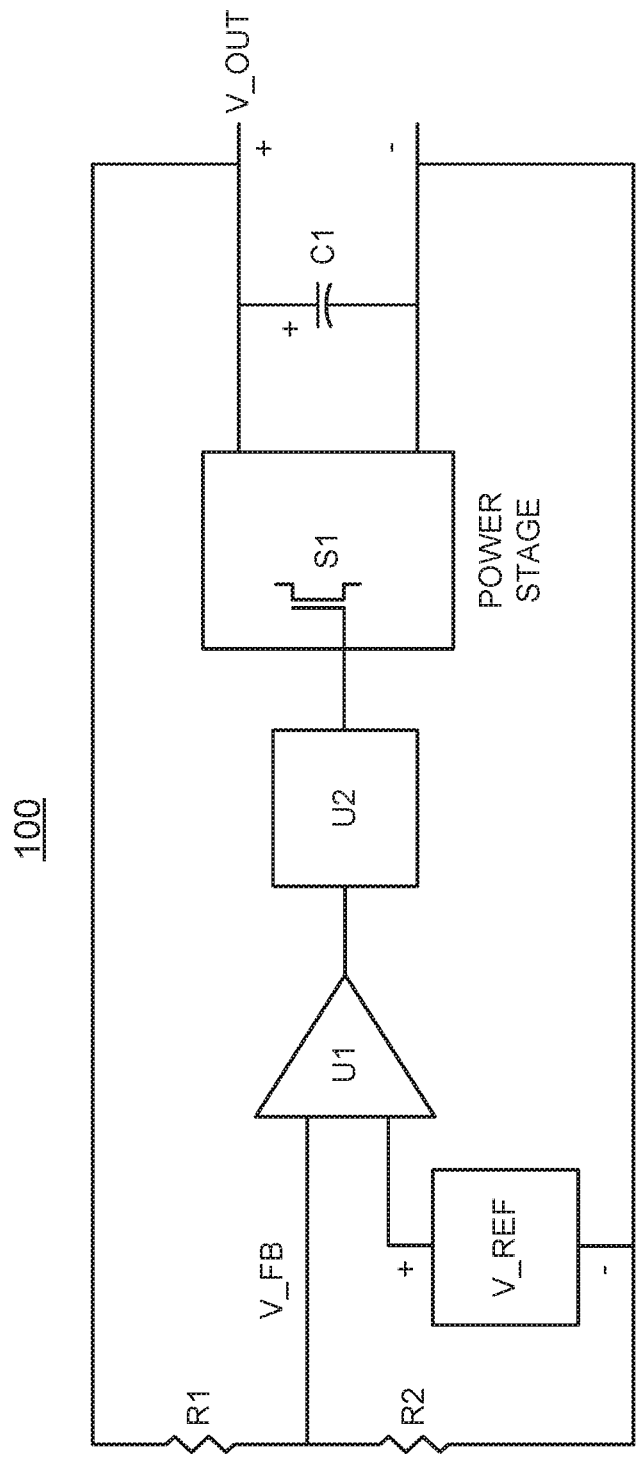
FIG. 1 is a diagram of a conventional fixed-output-voltage switching power converter.
Figure 2:
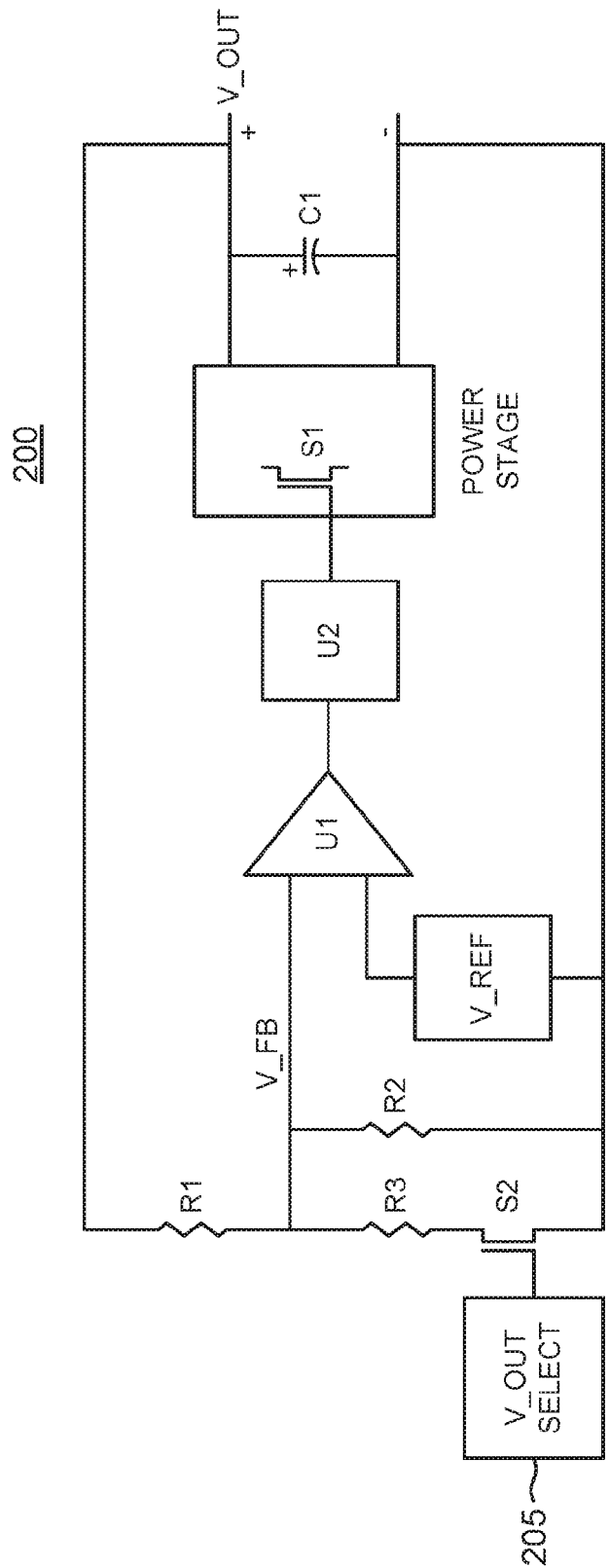
FIG. 2 is a diagram of a conventional fast-charge switching power converter having multiple output voltage modes.
Figure 3A:
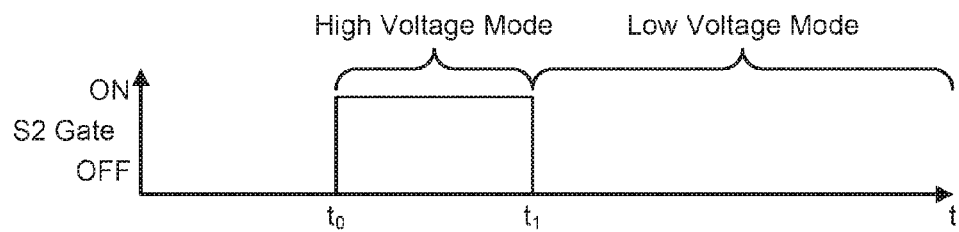
FIG. 3A illustrates a waveform for the switching of a fast-charge switch in the power converter of FIG. 2.
Figure 3B:
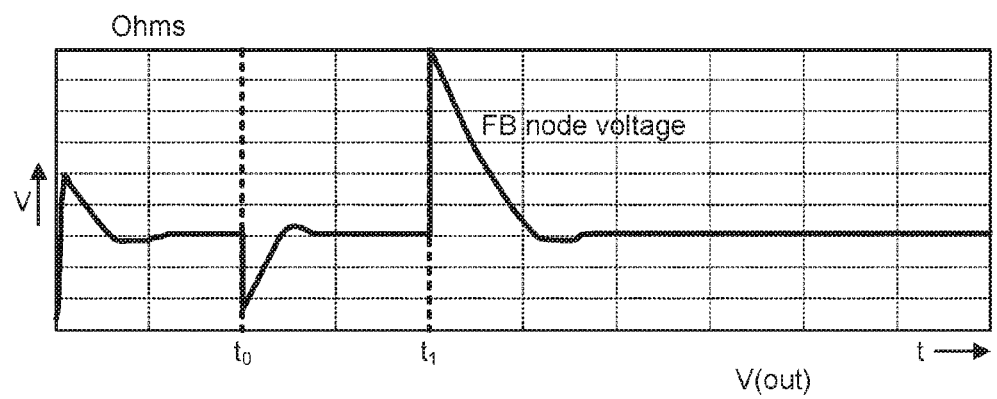
FIG. 3B illustrates a waveform for the feedback voltage input to the error amplifier in the power converter of FIG. 2 and ground during the cycling of the fast-charge switch shown in FIG. 3A.
Figure 3C:
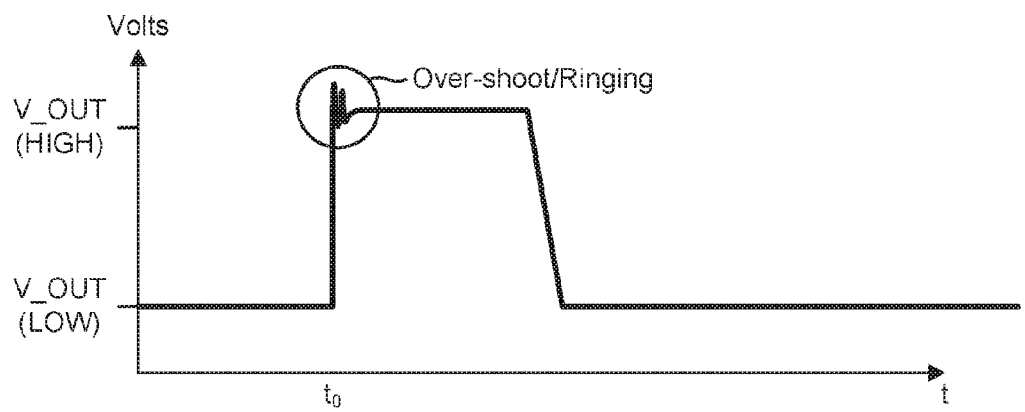
FIG. 3C illustrates a waveform for variable output voltage during the cycling of the fast-charge switch in FIG. 3A.

To address the need for preventing false overvoltage or undervoltage conditions for a switching power converter having multiple output voltage modes in which each output voltage mode corresponds to a unique output voltage a switching power converter is provided with an adaptive resistor for developing a feedback voltage. The adaptive resistor switches between multiple resistances corresponding to the multiple output voltage modes. During normal operation in each output voltage mode, a mode control circuit controls the adaptive resistor so that the corresponding resistance is maintained substantially constant. Such constant resistances are known in conventional switching power converters having multiple output voltage modes. But the transitions between resistances in conventional switching power converters having multiple output voltage modes is abrupt, which leads to undesirable overshoots and undershoots of the feedback voltage. In contrast, the mode control circuit for the power converter disclosed herein controls the adaptive resistor to gradually shift between its stable resistance levels over a delay period between consecutive output voltage modes. To provide the most stable feedback voltage, the rate of change for the resistance of the adaptive resistor during the delay period is linear but gradual nonlinearities are also acceptable. The resistance for the adaptive resistor during the delay period will thus have an average rate of change that hat is inversely proportional to the length of the delay period. As the delay period is lengthened, the rate of change for the resistance over the delay period is reduced whereas it is increased if the delay period is reduced. Although the exact length of the delay period will vary from embodiment to embodiment, the delay period will generally extend from 1 ms to tens of ms in length. The following discussion will thus assume that the delay period is 10 ms without loss of generality. Because the feedback voltage is maintained substantially constant over the delay period, the danger of false overvoltage and undervoltage conditions for the resulting switching power converter is greatly reduced or eliminated as compared to conventional architectures. In addition, the overshoot of the output voltage and its associated ringing as discussed with regard to FIG. 3C is also alleviated.

The same benefits obtained through the use of an adaptive resistor may also be obtained through the use of an adaptive reference voltage circuit that produces multiple unique reference voltages levels to select for the multiple output voltage modes. Just like the adaptive resistor, the adaptive reference voltage circuit would implement a delay period between consecutive output voltage modes in which the adaptive voltage reference is gradually changed in a substantially linear fashion from one unique reference voltage level to another. These advantageous features may be better appreciated through the following example embodiments.

Figures 4, 5:
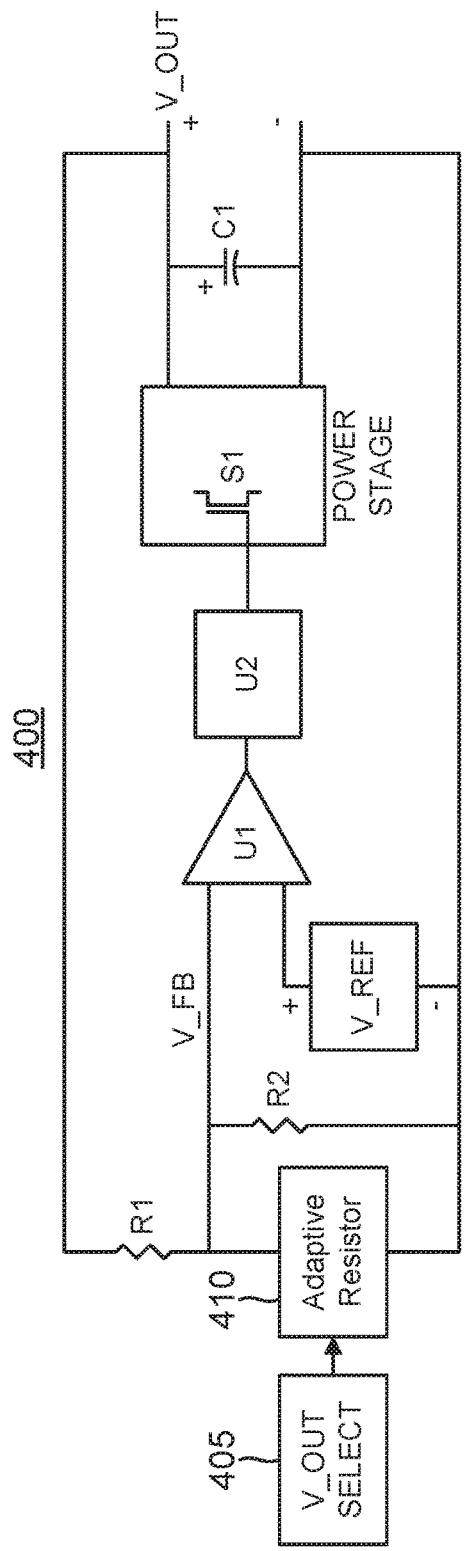
FIG. 4 is a diagram of a fast-charge switching power converter in accordance with an embodiment of the disclosure in which the adaptive resistor is in parallel with an additional resistor.
FIG. 5 is a diagram of a fast-charge switching power converter in accordance with an embodiment of the disclosure in which the adaptive resistor is not in parallel with any additional resistors.

A switching power converter 400 with an adaptive resistor 410 is shown in FIG. 4. Error amplifier U1, modulator U2, power switch S1, output capacitor C1, and the feedback voltage divider formed by resistors R1 and R2 operate as discussed with regard to fixed-output power converter 100. Adaptive resistor 410 is in parallel with resistor R2. A mode control circuit 405 controls the resistance of adaptive resistor 410 to select for the multiple output voltage modes and also to implement average rate of change over each delay period between consecutive output voltage modes. In an alternative embodiment as shown for a switching power converter 500 in FIG. 5, resistor R2 is not used. The remaining components for switching power converter 500 are as discussed with regard to switching power converter 400.

Figure 6:
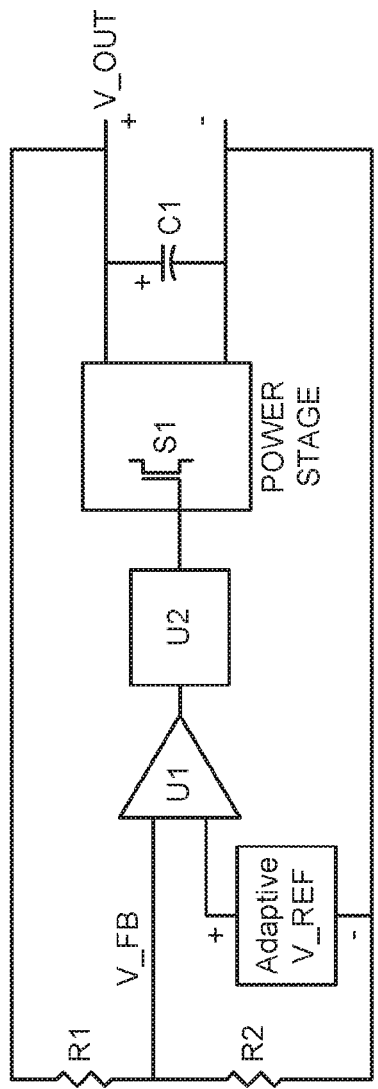
FIG. 6 is a diagram of a fast-charge switching power converter including an adaptive voltage reference in accordance with an embodiment of the disclosure.

A switching power converter 600 shown in FIG. 6 uses an adaptive reference voltage circuit 605 in lieu of an adaptive resistor. A control circuit 605 controls the adaptive reference voltage produced by adaptive reference voltage circuit so that it has a sufficiently linear rate of change over each delay period so that the feedback voltage is maintained substantially constant. It will be appreciated that both an adaptive resistor and an adaptive reference voltage circuit may be included in alternative switching power converter embodiments.

Figure 7C:
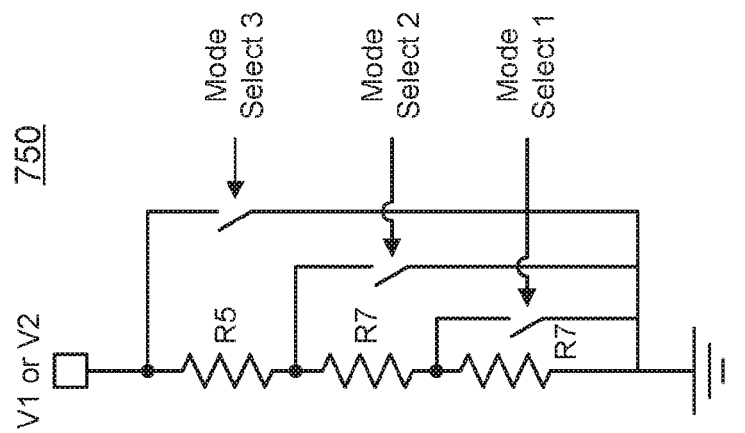
FIG. 7C illustrates a stepwise linear adaptive resistor in accordance with an embodiment of the disclosure.
Figure 7B:
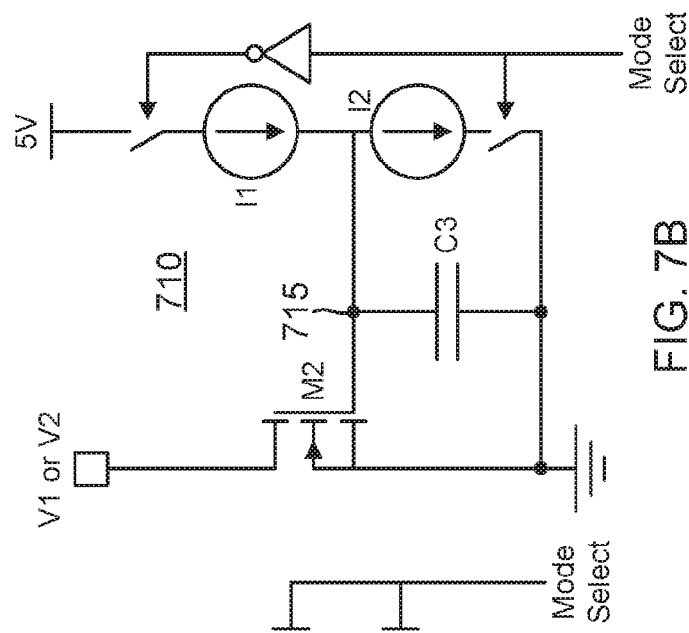
FIG. 7B illustrates an adaptive resistor including a capacitor charged and discharged by constant current sources in accordance with an embodiment of the disclosure.
Figure 7A:
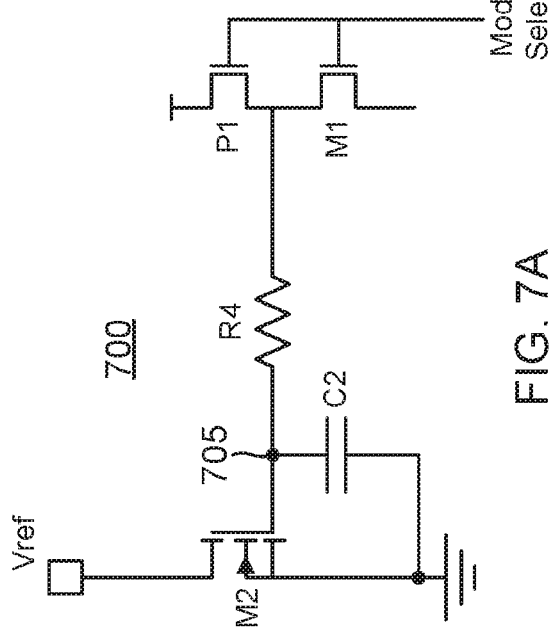
FIG. 7A illustrates a RC time constant adaptive resistor in accordance with an embodiment of the disclosure.

An example adaptive resistor 700 is shown in more detail in FIG. 7A 7. In this embodiment an inverter (comprising a PMOS transistor P1 having a source coupled to a power supply node (e.g., 5V) and a drain coupled to a drain of an NMOS transistor M1) drives a serial RC circuit comprising a resistor R4 coupled to a terminal 705 of a capacitor C2. Terminal 705 in turn drives a gate of an NMOS transistor M2 coupled between the feedback voltage input to the error amplifier (not illustrated) and ground. Adaptive resistor 700 thus can control for two output voltage modes depending upon whether transistor M2 is switched on or off by the voltage on its gate produced by terminal 705 of the capacitor. When transistor M2 is switched on, the feedback voltage drops so as to select for a high output voltage mode. Conversely, if transistor M2 is switched off the feedback voltage rises to select for a low output voltage mode. A mode select signal produced by a mode control circuit (not illustrated) drives the gates of the inverter transistor P1 and M1 to select for the modes. If the mode select signal is low, transistor P1 switches on to charge the capacitor. The rate of this charging is controlled by the time constant $\tau = RC$, where R is the resistance of resistor R4 and C is the capacitance for capacitor C2. Should capacitor C2 had been discharged prior to the mode select signal going low, terminal 705 would increase in voltage to some maximum value at an exponentially declining rate of change that is inversely proportional to the time constant. Although this rate of change is non-linear, it is sufficiently gradual such that the gate voltage of transistor M2 is controlled in an analog fashion. In contrast, the gate voltage for conventional fast-mode switch S2 is controlled in a digital fashion: either a binary one or a binary zero. The resulting analog change in the gate voltage for transistor M2 across the delay period causes the feedback voltage to remain relatively constant in that the control loop bandwidth for the corresponding switching power converter is such that it responds to the gradual change in the feedback voltage. For example, if the delay period is 10 ms, the average rate of change corresponds to a 100 Hz disturbance. In contrast, the feedback loop bandwidth is typically at least one 1 KHz or higher such that a 100 Hz disturbance is easily regulated for such that the feedback voltage remains substantially constant. The nonlinearity in the RC charging of terminal 700 and the resulting non-linear response of the transistor M2 will tend to produce disturbances in the feedback voltage having a higher frequency than the average rate of change over the delay period. But even a 500 Hz disturbance is readily accommodated by a 1 KHz feedback loop bandwidth.

Figure 8:
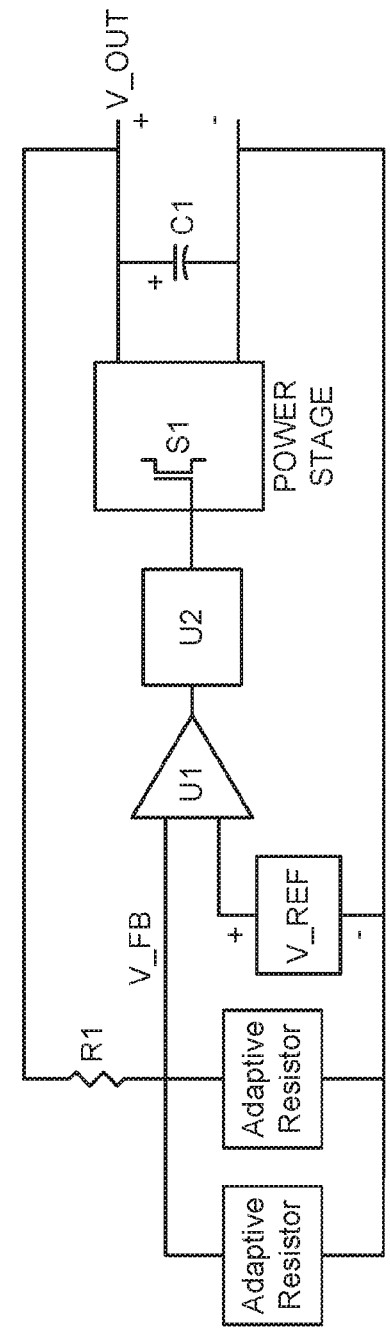
FIG. 8 is a diagram of a switching power converter including a pair of adaptive resistors arranged in parallel in accordance with an embodiment of the disclosure.

The gradual switching on of transistor M2 using the analog voltage from terminal 700 that gradually changes over the delay period produces a corresponding gradual change in the feedback voltage that sharply reduces or eliminates the problem of false overvoltage and undervoltage conditions that would otherwise result from conventional digital switching schemes. But this switching is between just two output voltage modes. The combination of two adaptive resistors in parallel between the input node carrying the feedback voltage to the error amplifier can be independently controlled through corresponding mode control signals so as to produce more than two output voltage mode. An example switching power converter 800 including two adaptive resistors in parallel is shown in FIG. 8. For illustration clarity, the independent control signals and the corresponding control circuit are not shown in FIG. 8. Should the parallel adaptive resistors be configured as shown for adaptive resistor 700, a highest output voltage mode results from both transistors M2 in the pair being switched on. A medium output voltage results from one of the transistor transistors M2 being on but the other off. Finally, a lowest medium output voltage results from both transistor transistors M2 being switched off. It will be appreciated that additional output voltage modes may be accommodated through the use of additional adaptive resistors.

But note that obtaining a sufficient time constant using adaptive resistor 700 may demand a relatively large amount of die space. To achieve a more compact design, an adaptive resistor 710 may be used as shown in FIG. 7B. Analogous to adaptive resistor 700, transistor M2 has its gate driven by an analog voltage developed at a terminal 715 of a capacitor C3. But capacitor C3 is charged and discharged responsive to constant current sources I1 and I2, respectively. A mode select signal as inverted through an inverter closes an upper switch to couple current source I1 to a power supply node so that it may charge capacitor C3. The voltage at terminal 715 will rise in a substantially linear fashion from the resulting constant current charging of capacitor C3 so that transistor M2 is switched on in an analog fashion over the delay period to select for a high voltage mode as discussed analogously with regard to adaptive resistor 700. At the same time, the mode select signal switches off a lower switch so that current source I2 is prevented from discharging the voltage of terminal 715. To select for a low output voltage mode, the binary state of the mode select signal is switched so that the upper switch turns off and the lower switch is switched on. Current source I2 will then discharge the voltage at terminal 715 in a linear fashion over the delay period so that transistor M2 is gradually switched off to select for the low output voltage mode. It will be appreciated that two or more of adaptive resistors 710 may be combined in parallel as discussed with regard to FIG. 8 to select for more than two output voltage modes.

Figure 9:
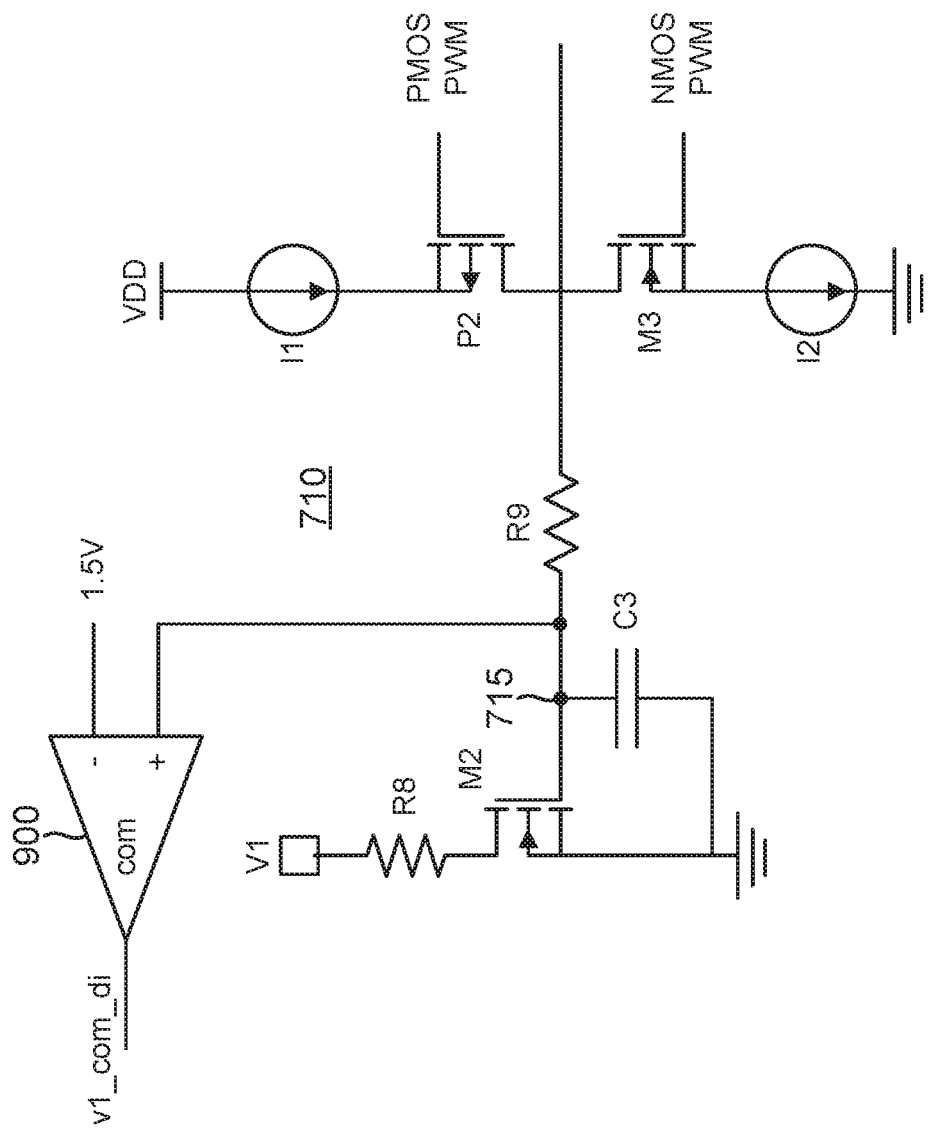
FIG. 9 is a circuit diagram for the adaptive resistor of FIG. 7B.

A more detailed circuit diagram for adaptive resistor 710 is shown in FIG. 9. The upper switch is implemented using a PMOS transistor P2 whereas the lower switch comprises an NMOS transistor M3. A relatively small resistor R9 may couple between a terminal for each of the switches and terminal 715 of capacitor C3. The drain of transistor M2 couples to the feedback voltage node through a resistor R8. To enable the use of a relatively small capacitor C3 and thus save die space, switch transistors P2 and M3 are pulse width modulated (PWM) through a PMOS PWM and an NMOS PWM control signal, respectively. To select for a high output voltage mode, the pulse width for the PMOS PWM control signal is gradually decreased over the desired delay period while the NMOS PWM signal is grounded. In this embodiment, the threshold voltage for transistor M2 is 1.2 V. A comparator 900 may thus compare the gate voltage for transistor M2 to a reference voltage such as 1.5 V that is slightly higher than the threshold voltage for transistor M2. When this voltage exceeds the threshold, the comparator 900 may assert a control signal (V1_com_di) to trigger the control circuit (not illustrated) controlling the pulse width modulation to more quickly decrease the pulse width of the PMOS PWM control signal so that transistor P2 is eventually maintained fully on. To select for the low voltage mode, the PMOS PWM signal is maintained high to keep transistor P2 off while the pulse width for the NMOS PWM control signal is gradually increased over the desired delay period. For example, suppose the power supply voltage VDD is 5V. During the decline from 5V to the reference voltage level (e.g., 1.5 V) for the gate voltage, the control signal from comparator 900 is high such that the rate of change for the pulse width for the NMOS PWM control signal may be relatively fast and then slowed when the control signal from comparator 900 indicates that the gate voltage is less than the reference voltage. The resulting pulse width modulation is advantageous in that relatively small current sources and a relatively small capacitance for capacitor C3 may be used so as to save die space yet still achieve a sufficiently long delay period.

Rather than control the gate voltage of a transistor in an analog fashion, digital switching may be used as shown for an adaptive resistor 750 in FIG. 7C. A set of resistors R5, R6, and R7 are arranged in series but may be arranged in parallel in alternative embodiments. Resistor R5 has a terminal coupling to the feedback voltage node and also to a first switch controlled by a mode select signal 3. An opposing terminal of resistor R5 couples to a terminal of resistor R6 that also couples to a second switch controlled by a mode select signal 2. An opposing terminal of resistor R6 couples to a terminal of resistor R7 that also couples to a first switch controlled by a mode select signal 1. Depending upon which switches are turned on or off, the resistance of adaptive resistor 750 change in digital steps. Such transitions are abrupt but if there are a sufficient number of them the resistance for adaptive resistor 750 may be changed in a sufficiently gradual fashion over the desired delay period.

Figure 10A:
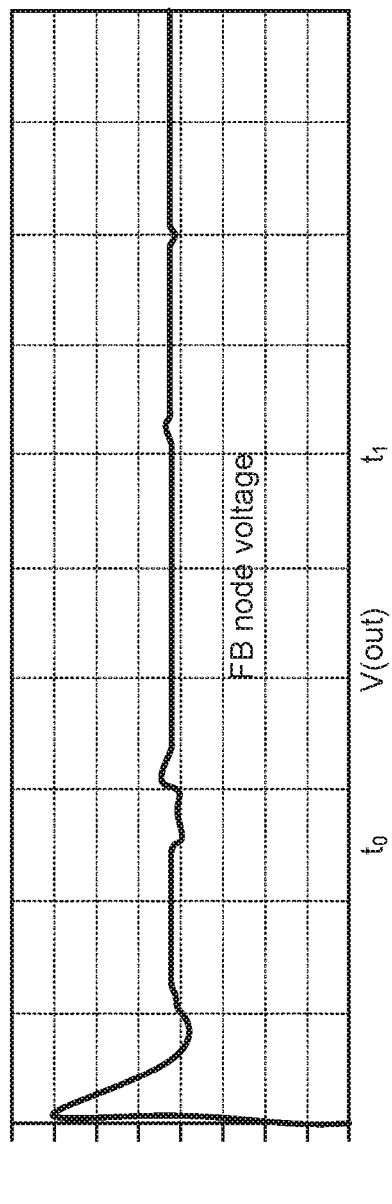
FIG. 10A illustrates the feedback voltage waveform for a switching power converter in accordance with an embodiment of the disclosure.
Figure 10B:
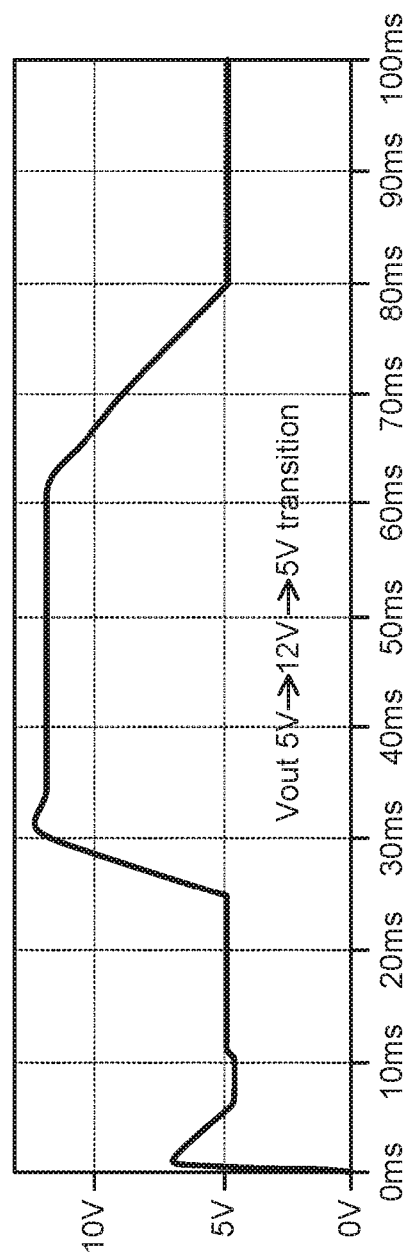
FIG. 10B illustrates the output voltage waveform for the switching power converter of FIG. 10A.

Regardless of whether an adaptive resistor and/or an adaptive reference voltage circuit is used, the resulting stabilization of the feedback voltage despite the changing output voltage modes is quite advantageous. For example, a waveform for a feedback voltage is shown in FIG. 10A for a switching power converter configured in accordance with an embodiment of the disclosure. At time t0 through a time t1, a high output voltage is selected for yet there is relatively little disturbance in the feedback voltage. The corresponding output voltage is shown in FIG. 10B. Not only is the danger of false overvoltage or undervoltage conditions controlled or eliminated but the overshoot of the output voltage (and the associate ringing) is also reduced as compared to conventional approaches at the transition to the high output node at time to.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A switching power converter, comprising:
    a voltage divider configured to produce a feedback voltage from an output voltage, the voltage divider including an adaptive resistor configured to produce an adaptive resistance for changing the feedback voltage, and a
    a control circuit configured to control the adaptive resistor so that the adaptive resistance has a first value during a first output voltage mode for the switching power converter in which a cycling of a power switch is modulated so the output voltage is regulated to equal a first voltage and so that the adaptive resistance has a second value during a second output voltage mode for the switching power converter in which the cycling of the power switch is modulated so that the output voltage is regulated to equal a second voltage, wherein the first voltage and the second voltage are different, the second value being greater than the first value, and wherein the adaptive resistor is configured to increase its adaptive resistance over a delay period in a transition between the first value and the second value.

2. The switching power converter of claim 1, wherein the adaptive resistor is further configured to continually decrease its adaptive resistance over the delay period in a transition between the second value and the first value.

3. The switching power converter of claim 1, wherein the adaptive resistor is further configured so that the delay period has a duration between 1 millisecond and 20 milliseconds.

4. The switching power converter of claim 1, further comprising:
    a reference circuit configured to provide a reference voltage; and
    an error amplifier having a first input terminal for receiving the feedback voltage and a second input terminal for receiving the reference voltage, the error amplifier being configured to compare the feedback voltage to the reference voltage to produce an error voltage, wherein the adaptive resistor is coupled between the first input terminal and ground.

5. The switching power converter of claim 4, wherein the adaptive resistor comprises a transistor having a first terminal coupled through a first resistor to the first input terminal and a second terminal coupled to ground, and wherein a capacitor is coupled between a gate of the transistor and ground, and wherein the adaptive resistor is configured to continually charge the capacitor during the delay period.

6. The switching power converter of claim 5, wherein the adaptive resistor further comprises an inverter configured to drive a first terminal of a second resistor having a second terminal coupled to the gate of the transistor.

7. The switching power converter of claim 5, wherein the adaptive resistor further comprises a first current source configured to continually charge the transistor during the delay period.

8. The switching power converter of claim 4, further comprising:
    a power switch; and
    a modulator configured to modulate a cycling of the power switch responsive to the error voltage.

9. The switching power converter of claim 1, wherein the adaptive resistor comprises a pair of adaptive resistor coupled in parallel.

10. A method for a switching power converter, comprising:
    in a first output voltage mode for the switching power converter in which a power switch is modulated so that an output voltage is regulated to equal a first voltage, dividing an output voltage for the first output voltage mode through a voltage divider including an adaptive resistance having a first value to produce a feedback voltage; and
    during a transition from the first output voltage mode to a second output voltage mode in which the power switch is modulated so that the output voltage is regulated to equal a second voltage that is different from the first voltage, changing the adaptive resistance from the first value to a second value over a delay period.

11. The method of claim 10, wherein the second value is less than the first value, and wherein changing the adaptive resistance over the delay period comprises continually decreasing the adaptive resistance over the delay period, and wherein an output voltage for the second output voltage mode is greater than the output voltage for the first output voltage mode.

12. The method of claim 11, further comprising enumerating a device to be charged to determine if the device supports the output voltage for the second output voltage mode prior to transitioning from the first output voltage mode to the second output voltage mode.

13. The method of claim 11, wherein continually decreasing the adaptive resistance over the delay period comprises charging a capacitor over the delay period and a driving a gate voltage of a transistor in a voltage divider using the charged capacitor over the delay period.

14. The method of claim 10, further comprising:
during a transitioning from the second output voltage mode to the first output voltage mode; continually changing the adaptive resistance from the second value to the first value over the delay period.

15. The method of claim 10, further comprising comparing the feedback voltage to a reference voltage to produce an error signal.

16. The method of claim 15, further comprising: modulating a cycling of a power switch responsive to the error signal to regulate the output voltage.

* * * * *